United States Patent [19]

Hoye

[11] 4,434,961

[45] Mar. 6, 1984

[54] UNIVERSAL PIVOTING AND FOLDING BEVERAGE HOLDER APPARATUS

[76] Inventor: Thomas M. Hoye, 6850 N. 86th St., Scottsdale, Ariz. 85253

[21] Appl. No.: 488,030

[22] Filed: Apr. 25, 1983

[51] Int. Cl.³ .............................................. A47K 1/09
[52] U.S. Cl. .................................. 248/311.2; 211/81; 108/44
[58] Field of Search .................... 248/311.2, 276, 184; 211/78, 80, 81, 99; 108/3, 26, 44, 47; 312/266

[56] References Cited

U.S. PATENT DOCUMENTS

| | | |
|---|---|---|
| 1,079,192 | 11/1913 | Sowden . |
| 1,121,179 | 12/1914 | Frumer . |
| 2,279,442 | 4/1942 | Burns ................................ 248/311.2 |
| 2,649,270 | 8/1953 | Franks .............................. 248/311.2 |
| 2,754,078 | 7/1956 | Koger ............................... 248/311.2 |
| 2,903,225 | 9/1959 | Weinstein . |
| 3,233,858 | 2/1966 | Benjamin ......................... 248/311.2 |
| 3,391,891 | 7/1968 | Garden . |
| 3,637,184 | 1/1972 | O'Brien ............................ 248/311.2 |
| 3,994,465 | 11/1976 | Rudnitzky ....................... 248/311.2 |
| 4,324,381 | 4/1982 | Morris .............................. 248/311.2 |

FOREIGN PATENT DOCUMENTS

| | | | |
|---|---|---|---|
| 273726 | 10/1966 | Australia ......................... 248/311.2 |
| 963441 | 2/1975 | Canada ............................ 248/311.2 |
| 1278956 | 11/1961 | France ............................. 248/311.2 |

Primary Examiner—Ramon S. Britts
Assistant Examiner—Robert A. Olson
Attorney, Agent, or Firm—H. Gordon Shields

[57] ABSTRACT

Beverage holder apparatus pivots on two axes and folds for storage. A bottom plate on which the beverage rests is secured to a support bracket which in turn is secured to a holder ring through which the beverage extends, and the bottom plate, support bracket, and holder ring pivot together. The holder ring is in turn secured to a support ring, which is pinned to and accordingly pivots on a hinge plate which in turn pivots on a fixed plate.

20 Claims, 7 Drawing Figures

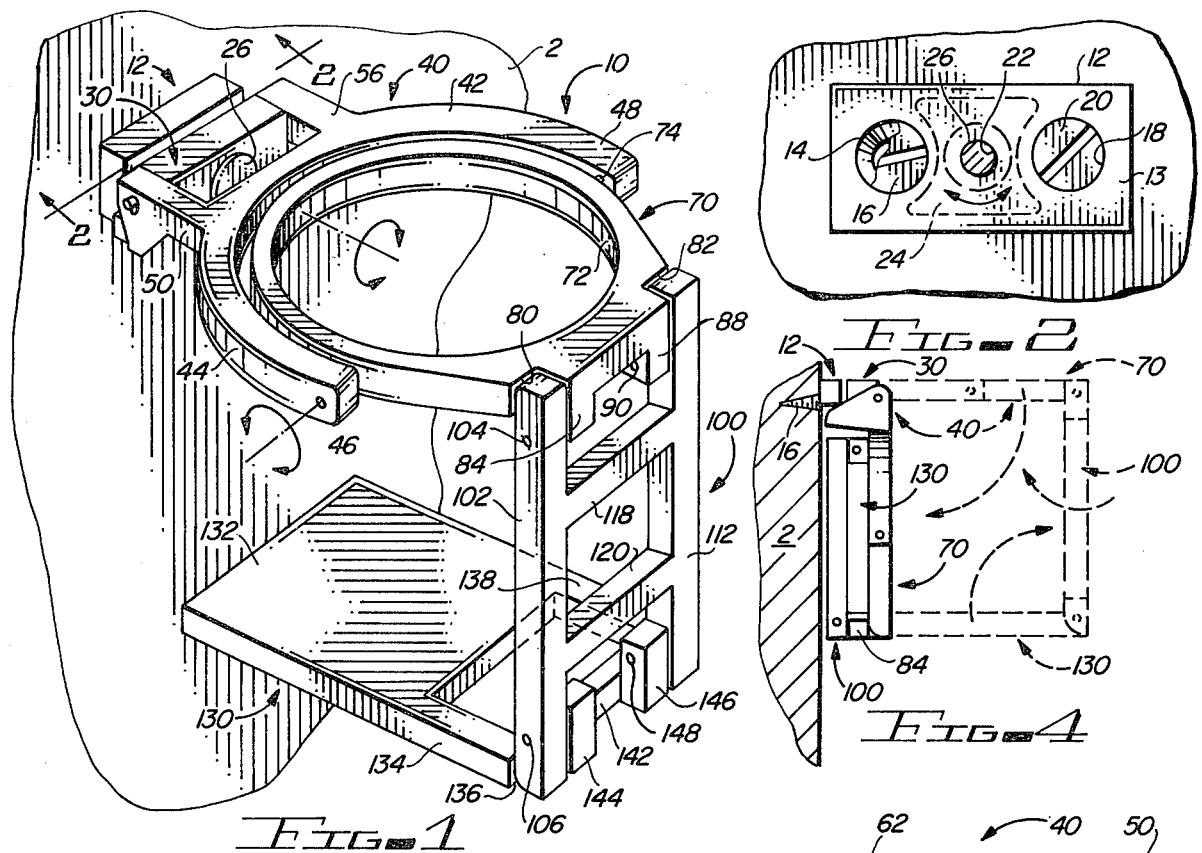
Fig-1
Fig-2
Fig-4
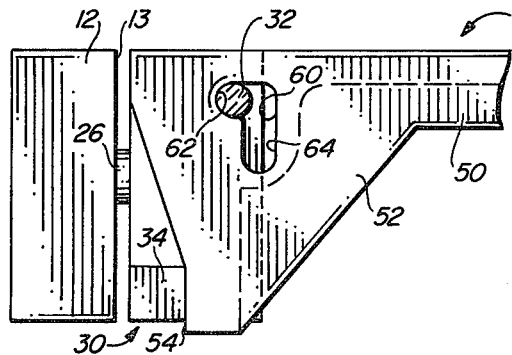
Fig-3A
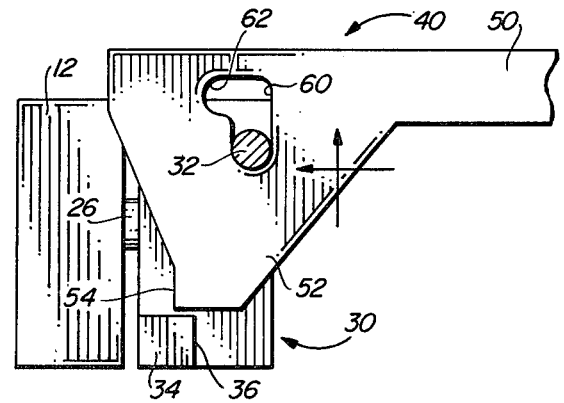
Fig-3B
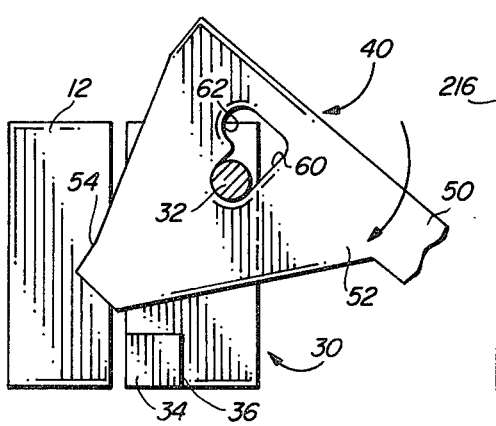
Fig-3C
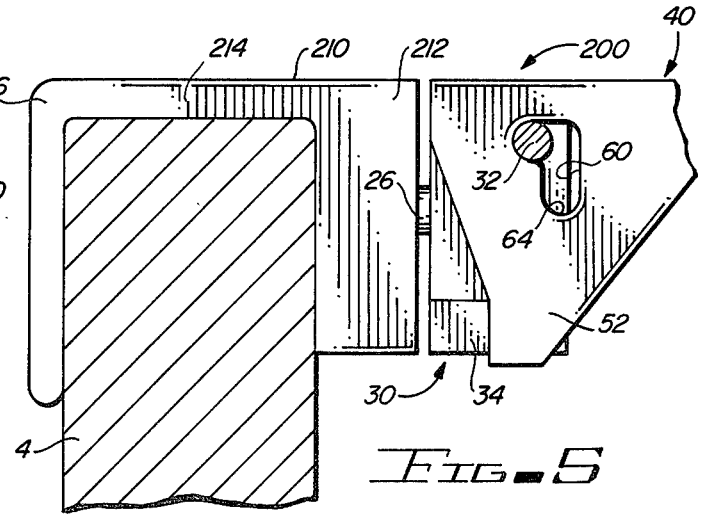
Fig-5

UNIVERSAL PIVOTING AND FOLDING BEVERAGE HOLDER APPARATUS

BACKGROUND OF THE INVENTION

1. Field of the Invention

This invention relates to beverage holders and, more particularly, to a beverage holder which pivots and swivels to compensate for movement of a boat or other vehicle to which the apparatus is secured and the entire assembly folds for storage when not in use.

2. Description of the Prior Art

U.S. Pat. No. 1,079,192 discloses a bottle holder which includes a back plate and two rings, the bottom ring of which includes an inwardly extending flange for receiving the bottom of a bottle. The bottle extends to the upper ring and is accordingly supported on the bottom ring. Both rings fold flat against the fixed back plate.

U.S. Pat. No. 1,121,179 discloses a back plate and two elements pivotally secured to the back plate. The bottom plate is spring loaded to provide a bias against the back plate when the bottom plate is not down and in use for holding a bottle. The second pivotable plate is pivotally secured to the side of the back plate and accordingly it pivots 90° with respect to the bottom plate. The purpose of the side plate is to hold the bottom plate in its down or open position against the bias of the bottom plate's spring.

U.S. Pat. No. 2,649,270 also discloses a folding receptacle holder for a beverage glass or the like. Two plates are held in a parallel relationship by appropriate linkage, and they both pivot on a back plate from an "up" or folded position to a "down" or open position. The outermost element defines a bottom plate when the apparatus is in its open position, and the uppermost element comprises a ring through which the cup, or the like, extends.

U.S. Pat. No. 2,754,078 discloses another type of holder in which a bottom plate folds outwardly from a back plate, and an upper ring folds outwardly and upwardly. For nesting or closed purposes, the upper ring folds downwardly and the bottom plate folds upwardly to enclose the ring and to act as a cover for the apparatus.

U.S. Pat. No. 2,903,225 discloses another type of holder apparatus which includes a bottom spring element and an upper ring element. The ring element includes a gap through which a cup handle extends. The cup extends through the ring element and against the bottom spring element. The longer or heavier the cup which extends through the open ring element, the more compressed the spring element is.

U.S. Pat. No. 3,233,858 discloses another folding cup holder apparatus with an upper ring and a lower bottom plate. The bottom plate is smaller than the upper ring and folds within the upper ring for storage purposes. The bottom folds upwardly and the upper ring folds downwardly and outside the bottom plate. Both the bottom plate and the upper ring are pivotally secured to a back plate.

U.S. Pat. No. 3,391,891 discloses a wire hanger apparatus for holding a vacuum bottle, or the like, as from a vehicle seat or window. The hanger includes two upper loops, open at the bottom, which hang over a vehicle seat, in a window, etc. A plurality of rings are supported on cross pins and the vacuum bottle extends through the ring. At the bottom of the apparatus is a support for the bottom of the thermos bottle.

SUMMARY OF THE INVENTION

The invention described and claimed herein comprises a foldable and pivoting support holder for beverage containers, such as a cup, a glass, a can, a bottle, etc., which includes elements pivotable in two planes for maintaining the beverage container in a relatively vertical orientation regardless of the motion of the vehicle to which the apparatus is secured. The container also folds and nests within itself for stowage or storage purposes.

Among the objects of the present invention are the following:

To provide new and useful beverage holder apparatus;

To provide new and useful beverage holder apparatus which is foldable for storage purposes To provide new and useful beverage holder apparatus for vehicles; and To provide new and useful beverage holder apparatus pivotable in two planes.

BRIEF DESCRIPTION OF THE DRAWING

FIG. 1 is a perspective view of the apparatus of the present invention.

FIG. 2 is a front view of a portion of the apparatus of the present invention.

FIGS. 3A, 3B, and 3C are side views of a portion of the apparatus of the present invention sequentially illustrating a feature thereof.

FIG. 4 is a side view of the apparatus of the present invention in its folded configuration.

FIG. 5 is an enlarged view of a portion of the apparatus of the present invention showing an alternate embodiment thereof.

DESCRIPTION OF THE PREFERRED EMBODIMENT

FIG. 1 is a perspective view of cup holder apparatus 10 in its open position. The cup holder apparatus 10 is secured to a bulkhead 2 of a boat, or the like. The cup holder apparatus 10 in FIG. 1 is shown open, ready to receive a cup, beverage, or the like.

The cup holder apparatus 10 includes six primary elements, including a base plate 12 which is secured directly to the bulkhead 2. Pivotally secured to the base plate 12 is a hinge plate 30. The hinge plate 30 comprises a second primary element. The hinge plate 30 is substantially the same size and configuration as the base plate 12, and both of them are of a generally rectangular configuration. The hinge plate 30 is pivotally secured to the back plate 12 by means of a rivet 26 or other appropriate fastener element. The rivet 26 provides a swiveling or pivoting connection to allow the hinge plate 30 to pivot relative to the back plate 12.

A support ring 40, the third primary element, is secured to the hinge plate 30. FIGS. 3A, 3B, and 3C illustrate the securing of the support ring 40 to the hinge plate 30. The securing of the support ring to the hinge plate 40 allows for the support ring to be locked into place in its open configuration, as shown in FIG. 1, and also allows the support ring 40, and the other elements secured thereto, to be compactly folded against the bulkhead 2 for storage purposes. This is illustrated in FIG. 4.

A holder ring 70 is appropriately secured to the support ring 40. The holder ring 70 comprises the fourth primary element. While the support ring 40 defines a generally semicircular yoke, the holder ring 70 comprises a full ring extending for 360°. There is a pivoting relationship between the holder ring and the support ring by means of a pin type securement between the holder ring and the support ring.

Pivotally secured to the outer portion of the holder ring 70, remote from the support ring 40 and the plates 12 and 30, is a vertical support bracket 100, the fifth primary element. The vertical support bracket 100 is also pinned to the holder ring 70. The pinned connection between the vertical bracket 100 and the holder ring 70 allows the support bracket 100 to be moved relative to the support ring for folding and subsequent storage purposes.

Finally, the sixth primary element for the cup holder apparatus 10 is a bottom plate or platform element 130. It is secured, also by a pinned engagement, to the vertical support bracket 100 remote from the holder ring 70. The bottom plate or platform element 130 extends generally parallel to the holder ring 70 and to the support ring 40.

The bottom plate 130 is disposed beneath the holder ring 70. The bottom plate 130 defines a platform on which a glass, beverage can, etc., is disposed. The bottom plate 130 is secured to the lower portion of the support bracket 100 by a pinned relationship which allows it to pivot relative to the vertical support bracket for folding purposes.

FIG. 2 comprises a front view of the base plate 12 showing how it is secured to the bulkhead 2. The base plate 12 is of a generally rectangular configuration, as mentioned above. It includes a generally flat or planar front face 13. Extending through the base plate 12, inwardly or rearwardly from the front face 13, are three apertures, including an aperture 14, an aperture 18, and an aperture 22. The aperture 22 is generally centrally located with respect to the base plate 12. The aperture 22 receives the shank of the rivet 26 which secures the hinge plate 30 to the base plate 12.

The apertures 14 and 18 receive appropriate elements, such as screws 16 and 20, respectively, for securing the base plate 12 to the bulkhead 2. The apertures 14 and 18 may be appropriately tapered so that the heads of the fastening elements, such as the screws 16 and 20, will be flush with the front surface 13 of the base plate 12 so as not to interfere with the pivoting action of the hinge plate 30.

In FIG. 2, there is shown in phantom (dotted line) the general outline of a recess 24. The recess 24 is on the back side of the base plate 12, facing the bulkhead 2, remote or opposite from the front face 13. The purpose of the recess 24 is to receive a portion of the rivet 26 which provides for the pivoting relationship or engagement between the base plate 12 and the hinge plate 30.

The employment of a rivet or similar fastening element to secure the hinge plate 30 to the base plate 12 allows the hinge plate 30 to pivot relative to the base plate 12. This pivoting action is indicated by the double-headed arrow beneath the aperture 22 and the shank of the rivet 26. Thus, while the base plate 12 is fixedly secured to the bulkhead 2, the hinge plate 30 pivots in the direction shown by the double-headed arrow. The pivoting relationship between the hinge plate 30 and the base plate 12 allows a beverage can, glass, cup, etc. disposed in the apparatus 10 to maintain a generally level or upright attitude regardless of the pitching movement of the boat or other vehicle that the holder apparatus 10 is secured to.

While the hinge plate 30 pivots relative to the base plate 12 and the bulkhead 2 only in a single plane, the pivoting engagement between the support ring 40 and the holder ring 70 is in a different plane, and the two pivoting motions together allow the bottom plate or platform element 130 to maintain a generally level attitude. It will be noted that the pivoting relationship of the various elements comprise movement in two planes which are generally perpendicular to each other.

The hinge plate 30 is also of a generally rectangular configuration and is about the same size as the base plate 12. The hinge plate 30 includes a pair of aligned pivot pins which extend outwardly from the sides of the plate 30. One of the pins, a pin 32, is shown in FIGS. 3A, 3B, and 3C, generally in enlarged detail. The hinge plate 30 also includes a pair of stop elements or blocks extending outwardly from the bottom of the sides of the plate 30, generally remote from the pivot pins. A stop block 34 is shown in FIGS. 3A, 3B, and 3C. It will be noted, as best shown in FIGS. 3A, 3B, and 3C, that the hinge pins, such as the hinge pin 32, extend outwardly from the upper portion of the hinge plate 30 near the front of the hinge plate, remote from the base plate 12. The stop blocks, such as the stop block 34, also best shown in FIGS. 3A, 3B, and 3C, extend outwardly from the bottom of the plate 30 and near the rear edge, or adjacent the front face 13 of the base plate 12.

The stop block 34 is of a generally square configuration. It includes a front face 36 which defines a stop face for the support ring 40, and more particularly for a stop surface 54 thereof. The stop surface 54 will be discussed in more detail below in conjunction with FIGS. 3A, 3B, and 3C.

The support ring 40 includes a half ring 42. The half ring 42 includes a half ring arm 44 and a half ring arm 48. The half ring 42 actually extends slightly greater than one-half of a circle, or slightly greater than one-hundred-eighty degrees. At the outer ends of the half ring arms 42 and 48 are a pair of aligned pin apertures. A pin aperture 46 for the half ring arm 44 is shown in FIG. 1. The purpose of the pin apertures is to receive pins for securing the holder ring 70 to the support ring 40. A pin 74 is shown in FIG. 1 extending between the outer or distal end of the half ring arm 48 and the holder ring 70.

For securing the half ring 42 to the hinge plate 30 there is a pair of yoke arms 50 and 56. The yoke arms 50 and 56 extend rearwardly from the half ring arms 44 and 48, respectively, of the half ring 42 to the hinge plate 30. The yoke arms 50 and 56 are spaced apart a distance slightly greater than the width of the hinge plate 30 so that the hinge plate 30 is disposed within, or received between, the arms 50 and 56.

As best shown in FIGS. 3A, 3B, and 3C, the yoke arms cooperate with the pins and the stop blocks of the hinge plate 30. The yoke arm 50 includes a generally triangular configured tab 52 on the end of the yoke arm 50 remote from the half ring 42. The tab 52 includes a bottom stop surface 54 which, when the holder apparatus 10 is in its open position, as shown in FIG. 1, and as also shown in FIG. 3A, is disposed against the front stop surface 36 of the stop block 34. As shown in FIG. 3A, with the stop surface 54 of the tab 52 against the stop surface 36 of the stop block 34, the support ring 40 is locked in place. In this position, the yoke arm 50 extends outwardly substantially perpendicularly from the hinge plate 30 and from the base plate 12.

The stop surface 54 is on the lower rear surface of the tab 52, remote from the arm 50. The width of the tab 52, and of the arm 50, is preferably the same as the length of the stop block 34. For receiving the pins of the hinge plate 30, there are a pair of slots on the tabs of the yoke arms. In FIGS. 3A, 3B, and 3C are best shown a slot 60 for the tab 52 of the arm 50. The tab for the yoke arm 56 also includes a slot substantially identical to the slot 60 and aligned therewith.

The slot 60 is of a general "L" shaped configuration, albeit upside down, as viewed from the side, such as in FIGS. 3A, 3B, and 3C. The slot 60 may also be considered as in the configuration of a stylized number "7".

The slot 60 includes an upper rear lock portion 62. The lock portion 62 defines the horizontal arm portion of the slot 60. The rear lock portion 62 is relatively short as compared to the overall length or height of the slot 60. The pin 32 is disposed in the rear lock portion 62 of the slot 60 in FIG. 3A. With the pin 32 of the hinge plate 30 extending into the rear lock portion 62, and with the lower rear stop surface 54 of the tab 52 disposed against the lock surface 36 of the stop block 34, as shown in FIG. 3A, and as also shown in FIG. 1, the support ring 40 is locked in place in its open position on the hinge plate 30.

In the locked and open position, the apparatus 10 is ready to receive a cup or beverage, etc., in the holder ring 70 and on the platform 130.

For stowage or storage purposes, the apparatus 10 may be folded, as will be described in greater detail below. FIGS. 3B and 3C show the sequential movement of the support ring 40 for the unlocking and folding of the support ring 40 for stowage or storage purposes. The support ring 40 is first moved rearwardly relative to the pin 32 and to the hinge plate 30 and the base plate 12 to move the pin 32 out of the rear lock portion 62 of the slot 60. A rearward movement of the support ring 40, and of the yoke arms, and particularly the yoke arm 50 as illustrated in FIGS. 3A, 3B, and 3C, will cause the pin 32 to move out of the rear lock portion 62 and into the elongated vertical portion of the slot 60. The support ring 40 is then moved vertically upwardly, so that the pin 32 of the hinge plate 30 is disposed in the bottom lower pivot portion 64 of the slot 62. This is shown in FIGS. 3B and 3C. With the pin 32 in the lower pivot portion 64 of the slot 60, the support ring 40 may be pivoted downwardly, as shown by the arrow in FIG. 3C, for storage.

In FIG. 3B, the rearward movement of the support ring is shown by a horizontally extending arrow, and the upper movement of the support ring 40 is shown by a vertically extending arrow. The two movements, rearward and vertical, are thus preludes to the pivoting movement shown in FIG. 3C.

The holder ring 70 includes a circular inner periphery 72. The pins which secure the holder ring 70 to the support ring 40 are generally on a diameter of the circular inner periphery 72.

At the rear portion of the holder ring 70, remote from the support ring 40, are a pair of relieved portions 80 and 82. The width of the holder ring 70 is greater at the outer end or rear portion to compensate for the relieved portions. Extending downwardly from the outer end or rear portion of the holder ring 70, and adjacent to the relieved portions 80 and 82, are a pair of lower connecting arms 84 and 88. The lower connecting arms 84 and 88 extend downwardly substantially perpendicularly to the plane of the holder ring 70 a distance slightly greater than the thickness of the holder ring 70. That is, the length of the connecting arms downwardly from the bottom of the holder ring, is greater than the thickness of the holder ring. The reason for this, as will be discussed below, is to allow the pivot point of the vertical support bracket to be a sufficient distance below the bottom of the holder ring to allow for the compact folding and nesting of the platform 130 against the holder ring 70 and the support ring. The thickness of the support ring and the holder ring are the same, as best shown in FIG. 4.

The vertical support bracket 100 is secured to the holder ring 70 at the relieved portions 80 and 82. The vertical support bracket 100 includes a pair of vertically extending arms 102 and 112. The arms 102 and 112 are spaced apart from each other. The arm 102 is disposed within the relieved portion 80 and adjacent to the lower connecting arm 84 of the holder ring 70. The vertical arm 112 is disposed within the relieved portion 82, and adjacent to the lower connecting arm 88. The connecting arms 84 and 88 are disposed within or between the vertical arms 102 and 112.

A pair of cross arms, including an upper cross arm 118 and a lower cross arm 120, extend between and connect the vertical arms 102 and 112 of the support bracket 100.

A pair of upper pin apertures extend through the upper portions of the vertical arms 102 and 112. The pin aperture 104 is shown in FIG. 1. The pin apertures are aligned with mating apertures in the lower connecting arms 84 and 88 of the holder ring 70 to provide for the pinned connection between the holder ring 70 and the support bracket 100. A pin, not shown, extends through the pin aperture 104 to connect the arm 102 and the connecting arm 84. A similar connection is provided between the arm 112 and the connecting arm 88. A pin 90 is shown extending through a pin aperture in the connecting arm 88 of the holder ring 70. The pin 90 extends into the vertical arm 112.

As will be understood, the pinned connection between the holder ring 70 and the vertical support bracket 100 must be a sufficient distance below the bottom of the holder ring 70 and the support ring 40 to allow the support bracket 100 and the bottom plate 130 to be folded adjacent to the bottom of the support ring 40 and the holder ring 70. This is best illustrated in FIG. 4, and will be discussed in greater detail in conjunction therewith.

The bottom plate or platform element 130 is secured to the bottom of the vertical support bracket 100. The bottom plate 130 includes a generally flat platform portion 132 which is disposed in a generally aligned orientation with respect to the holder ring 70 and particularly with respect to the circular inner periphery 72 of the holder ring 70. The platform 132 is of a generally square configuration.

Extending outwardly from the platform 132 are a pair of legs 134 and 138. The legs include outer ends remote from the platform 132. The leg 134 includes an outer leg end 136 which is shown in FIG. 1 disposed against the lower portion of the vertical arm 102 of the vertical support bracket 100. When the cup holder apparatus 10 is in its open position, as shown in FIG. 1, the outer ends of the legs 134 and 138 abut against the lower portions of the vertical support bracket arms. The lower portions of the vertical support bracket arms and the platform leg's ends define mutually opposed stop surfaces for holding the platform 132 generally perpendicularly to the vertical support bracket 100 in the open, use configuration.

Secured to, and adjacent to, the outer ends of the legs 134 and 138 is a cross arm 142. Extending upwardly from the cross arm 132 are a pair of pivot arms 144 and 146. The pivot arms 144 and 146 extend generally upwardly between the vertically extending arms 102 and 112 of the support bracket 100. A pinned engagement or connection exists between the vertical arms 102 and 112 and the pivot arms 144 and 146, respectively.

A pin aperture 106 is shown extending through the lower portion of the vertical arm 102. The pin aperture 106 is aligned with an appropriate pin aperture in the pivot arm 144 and a pin (not shown) extends into the apertures. A similar pair of pin apertures, appropriately aligned, extends through the lower portion of the vertical arm 112 and the pivot arm 146. A pin 148 is shown extending through the pivot arm 146, and through its aperture. The pin 148 extends through the pivot arm 146 and into the vertical arm 112.

The pinned engagement between the bottom plate or platform element 130 and the vertical support bracket 100 is disposed above the top of the platform 132 a sufficient distance to allow the platform 130 to fold generally against the vertical support bracket 100. This is shown in FIG. 4.

As indicated and discussed above, when the holder apparatus 10 is in its open, use position, as shown in FIG. 1, the bottom plate or platform element 130 is disposed substantially perpendicularly to the vertical support bracket 100. The connection between the leg end 132 and the vertical arm 102, and a similar connection between the end of the leg 138 and the vertical arm 112, together, define the stops or down limits to hold the platform 130 substantially perpendicularly to the support bracket 100. A similar stop engagement between the upper portion of the arms 102 and 112 of the bracket 100 and the surfaces of the relieved portions 80 and 82 of the holder ring 70 maintain the perpendicularity between the support bracket 100 and the holder ring 70.

When the use of the apparatus 10 is no longer desired, the apparatus 10 may be folded for storage purposes. The folding and storage takes place in three primary movements, as sequentially illustrated in FIG. 4. The first movement, indicated by the dotted line arrow and the number "1" in FIG. 4, is the upward folding of the bottom platform element 130 against the vertical support bracket 100. It will be noted that the overall length of the bottom plate 130 is less than the length of the support bracket 100. Thus, the platform element 130 folds against the vertical support bracket 100 and terminates along the vertical support bracket 100 just below or beneath the bottom of the connecting arms 84 and 88. This is shown in FIG. 4.

The second pivoting movement for storing the apparatus 10 is the pivoting of the vertical support bracket 100 against the bottom of the support ring 40 and the holder ring 40. This is illustrated in FIG. 4 by the dotted line arrow and the number "2". As also shown in FIG. 4, in solid line, the conclusion of the second folding or pivoting movement actually results in the bottom plate or platform 130 being disposed between and virtually against the vertical support bracket 100 and the support ring 40 and the holder ring 70.

Finally, the third pivoting movement illustrated in dotted line with the number "3" in FIG. 4 is the downward pivoting of the support ring 40. This pivoting movement is also illustrated in FIGS. 3B and 3C. That is, the support ring 40 is first lifted from its locked position on the pins of the hinge plate 30, including the pin 32, as shown in FIG. 3B. Then, with the support ring 40 lifted with respect to the aligned pins, one of which is the pin 32, and the hinge plate 30, the support ring 40 is pivoted downwardly. The support ring 40 is aligned with the holder ring 70, and the folded vertical support bracket 100 and the bottom plate or platform element 130 is disposed against the support ring 40 and the holder ring 70, as the first two steps in the folding procedure. The support ring 40 is then moved or pivoted downwardly, as shown in FIG. 3C, to allow the apparatus 10 in its folded position to be disposed against the bulkhead 2. This is shown in solid line in FIG. 4.

The unfolding or opening of the holder apparatus 10 is accomplished by reversing the procedure just described.

FIG. 5 comprises a side view of an alternate embodiment of the apparatus of the present invention. A portion of a holder apparatus 200 is shown secured to the top of an element 4, which may be the side (gunwale, etc.) of a craft, a portion of a door of an automotive vehicle, or the like. The apparatus 200 includes five of the primary elements of the apparatus 10 plus a different sixth element. Two of the primary elements are shown, namely the hinge plate 30 and the support ring 40. Part of the tab 52 is shown in FIG. 5, secured to the hinge plate 30 by the pin 32 through the slot 60. The hinge plate 30 is in turn secured by a pivoting connection through the rivet 26 to a base yoke 210. The base yoke 210 includes a back plate 212 to which the rivet 26 is appropriately secured. The back plate 212 is disposed between the element 4 and the hinge plate 30.

Spaced apart from the back plate 212 is an outer plate 216. A top bridge or strap 214 extends between the upper portion of the back plate and the outer plate and secures them together. The length of the bridge or strap 214 may be fixed, as shown in FIG. 5, to accommodate a predetermined width between the two plates. Alternatively, the length may be made variable by well known techniques to accommodate elements between the base and outer plates of various sizes or thicknesses.

In the other major respects, the holder apparatus 200 is substantially identical to the holder apparatus 10. Thus, with the base yoke 210 substituted for the base plate 12, the holder apparatus 200 may be appropriately secured to various elements in a removable manner. However, the cooperation for folding or stowage purposes among the other elements of the apparatus 200, including the hinge plate 30, the support ring 40, the holder ring 70, the vertical support bracket 100, and the bottom plate or platform element 130, remains substantially the same as discussed above.

Returning to FIG. 1, within the circular inner periphery 72 of the holder ring 70 are a pair of arrows, including a straight arrow and a curved double-headed arrow. The straight arrow defines the axis of rotation or movement of the support ring 40 relative to the base plate 12. The double-headed curved arrow illustrates the rotation of the hinge plate 30, and the support ring, holder ring, etc., about the axis of rotation, which is through the rivet 26.

Another double-headed arrow is shown adjacent to the pin aperture 46 of the support ring 40. The double-headed arrow is curved, and it illustrates the rotation or pivoting action of the holder ring 70, the vertical support bracket 100, and the bottom plate or platform 130. This pivoting action or movement is about an axis of rotation which is along the aligned pin elements, such as the pin 74, and a pin (not shown) extending through the pin aperture 46, all as discussed above. It may thus be understood that the pivoting actions in two planes, both of which axes and planes are substantially perpendicular to each other, allows an element to be held or supported on the platform and/or in the holder ring, such as a glass, can, or beverage holder, cup, etc., disposed within the holder apparatus 10, and also within the holder apparatus 200, to remain relatively level regardless of the pitching or rolling of the boat or airplane or other vehicle to which the apparatus is secured.

It will be understood that the ease of pivoting, and also the ease of folding and unfolding, may be controlled to some extent by the tightness of the fit of the various pins and the rivet 26 which secure the various elements together. For example, it may be desirable to have a relatively freely pivotable or movable relationship between the support ring 40 and the holder ring 70, and between the hinge plate 30 and the base plate 12. However, for convenience in preventing the inadvertent opening or unfolding of the apparatus from its folded position, as shown in FIG. 4, outwardly, such as in response to a rolling or pitching motion when the apparatus 10, or the apparatus 200, is not in use, the other pin connections may be rather tight. Thus, the connections between the bottom plate or platform element 130 and the vertical support bracket 100, and between the vertical support bracket 100 and the holder ring 70, may be fairly tight. Similarly, the pin connection between the support ring 40 and the hinge plate 30, namely the movement of the pin 32 in the slot 60 for the yoke arm 50, and a similar pin and slot movement or cooperation for the yoke arm 56, may be relatively tight. Thus, a positive movement may be required by a user to unfold and then refold again the holder apparatus from and to the folded or stored position.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. Holder apparatus for holding an element, comprising, in combination:
    base means for securing the holder apparatus at a fixed location;
    hinge plate means pivotally secured to the base means;
    support ring means secured to the hinge plate means and pivotal therewith;
    holder ring means, through which the element extends, pivotally secured to the support ring means;
    support bracket means pivotally secured to the holder ring means remote from the support ring means; and
    platform means for receiving the element to be held and disposed beneath the holder ring means and pivotally secured to the support bracket means remote from the holder ring means.

2. The apparatus of claim 1 in which the hinge plate means pivots in a first plane relative to the base means.

3. The apparatus of claim 2 in which the support ring is releasably securable to the hinge plate means and is pivotable from a first locked position to a second stored position, and the first locked position is a use position.

4. The apparatus of claim 3 in which the holder ring means pivots relative to the support ring means and the hinge plate means in a second plane.

5. The apparatus of claim 4 in which the holder ring means pivots with the support ring means and the hinge plate means in the first plane.

6. The apparatus of claim 5 in which the support bracket means is disposed substantially perpendicularly to the holder ring means in its use position and pivots with the holder ring means.

7. The apparatus of claim 6 in which the support bracket means is pivotable relative to the holder ring means from its use position to a folded storage position substantially parallel to the holder ring means.

8. The apparatus of claim 7 in which the platform means is disposed substantially perpendicularly to the support bracket means in its use position.

9. The apparatus of claim 8 in which the platform means is pivotable relative to the support bracket means from its use position to a storage position substantially parallel to the support bracket means.

10. The apparatus of claim 9 in which the platform means pivots to its storage position substantially parallel and adjacent to the support bracket means, and the support bracket means, with the platform means disposed adjacent to it, pivots to its storage position substantially parallel and adjacent to the holder ring means and the support ring means, and the support ring means and the holder ring means, with the support bracket means and the platform means disposed adjacent thereto, pivots in the second plane to its storage position.

11. The apparatus of claim 1 in which the support ring is secured to the hinge plate means by a pinned connection.

12. The apparatus of claim 11 in which the hinge plate means and the support ring means include slot means for providing relative movement of the hinge plate means and the support ring means through the pinned connection.

13. The apparatus of claim 12 in which the slot means includes lock means for locking the support ring means relative to the hinge plate means in the use position.

14. The apparatus of claim 13 in which the hinge plate means and the support ring means further include stop means for supporting the support ring means in the use position.

15. The apparatus of claim 1 in which the hinge plate means includes a first pin and a second pin, and the support ring means is secured to the first and second pins of the hinge plate means.

16. The apparatus of claim 15 in which the support ring means includes
    a half ring,
    a first yoke arm secured to the half ring, a second yoke arm spaced apart from the first yoke arm and secured to the half ring, a first slot in the first yoke arm for receiving the first pin of the hinge plate means, and a second slot in the second yoke arm for receiving the second pin of the hinge plate means.

17. The apparatus of claim 16, in which the first and second slots of the support ring means each include a lock portion for receiving the first and second pins, respectively, for locking the support ring means in a use position; and a pivot portion for receiving the first and second pins, respectively, for pivoting the support ring means to a storage position.

18. The apparatus of claim 1 in which the base means comprises a base plate fixedly securable to a vehicle or the like.

19. The apparatus of claim 1 in which the base means comprises a base yoke removably securable to a vehicle or the like.

20. The apparatus of claim 19 in which the base yoke includes a base plate, a side plate spaced apart from the base plate, and a strap connecting the back plate and the side plate.

* * * * *